(12) United States Patent
Shimotsuma et al.

(10) Patent No.: US 7,310,463 B2
(45) Date of Patent: Dec. 18, 2007

(54) OPTICAL STRUCTURAL BODY, ITS MANUFACTURING METHOD AND OPTICAL ELEMENT

(75) Inventors: Yasuhiko Shimotsuma, Kyoto (JP); Kazuyuki Hirao, 8-94, Tanakashimoyanagi-cho, Sakyo-ku, Kyoto-shi 606-8204 (JP); Jianrong Qiu, Nara (JP)

(73) Assignees: Kyocera Corporation, Kyoto (JP); Kazuyuki Hirao, Kyoto (JP)

( * ) Notice: Subject to any disclaimer, the term of this patent is extended or adjusted under 35 U.S.C. 154(b) by 879 days.

(21) Appl. No.: 10/658,107

(22) Filed: Sep. 9, 2003

(65) Prior Publication Data

US 2004/0124343 A1    Jul. 1, 2004

(30) Foreign Application Priority Data

Sep. 9, 2002 (JP) ............................. 2002-263205
Mar. 26, 2003 (JP) ............................. 2003-085658

(51) Int. Cl.
*G02B 6/34* (2006.01)
*H01L 21/00* (2006.01)
*H04J 14/02* (2006.01)

(52) U.S. Cl. .......................... 385/37; 385/11; 385/14; 385/129; 385/141; 385/140; 438/29; 438/31; 438/32; 398/84; 398/87

(58) Field of Classification Search .................. 385/11, 385/14, 31, 37, 129, 130, 131, 141, 140; 438/29, 31, 32; 430/4, 5, 66, 135; 398/84, 398/87
See application file for complete search history.

(56) References Cited

U.S. PATENT DOCUMENTS 3,993,485 A * 11/1976 Chandross et al. ......... 385/141

5,157,747 A * 10/1992 Aktins et al. ................. 385/37
5,351,321 A *  9/1994 Snitzer et al. ................ 385/10

(Continued)

FOREIGN PATENT DOCUMENTS

JP            10-282337          10/1998     ............... 385/37 X (Continued)

OTHER PUBLICATIONS

Toshiaki Kondo et al., "Femtosecond Laser Interference Technique with Diffractive Beam Splitter for Fabrication of Three-Dimensional Photonic Crystal", Applied Physics Letters, vol. 79, No. 6, Aug. 6, 2001, pp. 735-727.

(Continued)

*Primary Examiner*—Brian M. Healy
(74) *Attorney, Agent, or Firm*—Hogan & Hartson LLP

(57) ABSTRACT

A single pulse laser beam of linear polarization is irradiated to a glass region such that the condensing point is located inside of the glass region, thereby to form, at the condensing point, a periodic structure region in which high refractive-index zones and low refractive-index zones are repeatedly being generated at pitches of 1 μm or less. Planes in which the high refractive-index zones or the low refractive-index zones are being joined to one another, are formed in parallel to the polarized magnetic field direction of the pulse laser. It is therefore possible to prepare an optical structural body having a submicron-order fine periodic structure which can readily be produced.

20 Claims, 8 Drawing Sheets

U.S. PATENT DOCUMENTS

| | | | | |
|---|---|---|---|---|
| 5,367,588 | A * | 11/1994 | Hill et al. | 430/5 |
| 5,636,304 | A * | 6/1997 | Mizrahi et al. | 385/37 |
| 6,344,298 | B1 * | 2/2002 | Starodubov et al. | 430/5 |
| 6,545,808 | B1 * | 4/2003 | Ehbets et al. | 359/566 |
| 7,068,884 | B2 * | 6/2006 | Rothenberg | 385/37 |
| 2001/0000714 | A1 * | 5/2001 | Borrelli et al. | 385/37 |

FOREIGN PATENT DOCUMENTS

| | | | |
|---|---|---|---|
| JP | 11-167024 | 6/1999 | 385/37 X |
| JP | 11-352327 | 12/1999 | 385/37 X |
| JP | 2000-193823 | 7/2000 | 385/37 X |
| JP | 2001-004817 | 1/2001 | 385/37 X |
| JP | 2001-066428 | 3/2001 | 385/37 X |
| JP | 2001-083321 | 3/2001 | 385/37 X |
| JP | 2002-311242 | 10/2002 | 385/37 X |
| JP | 2003-057442 | 2/2003 | 385/37 X |
| JP | 2003-066232 | 3/2003 | 385/37 X |

OTHER PUBLICATIONS

Ken-ichi Kawamura et al., "Holographic Encoding of Fine-Pitched Micrograting Structures in Amorphous SiO$_2$ Thin Films on Silicon by a Single Femtosecond Laser Pulse", Applied Physics Letters, vol. 78, No. 8, Feb. 19, 2001 pp. 1038-1040.

* cited by examiner

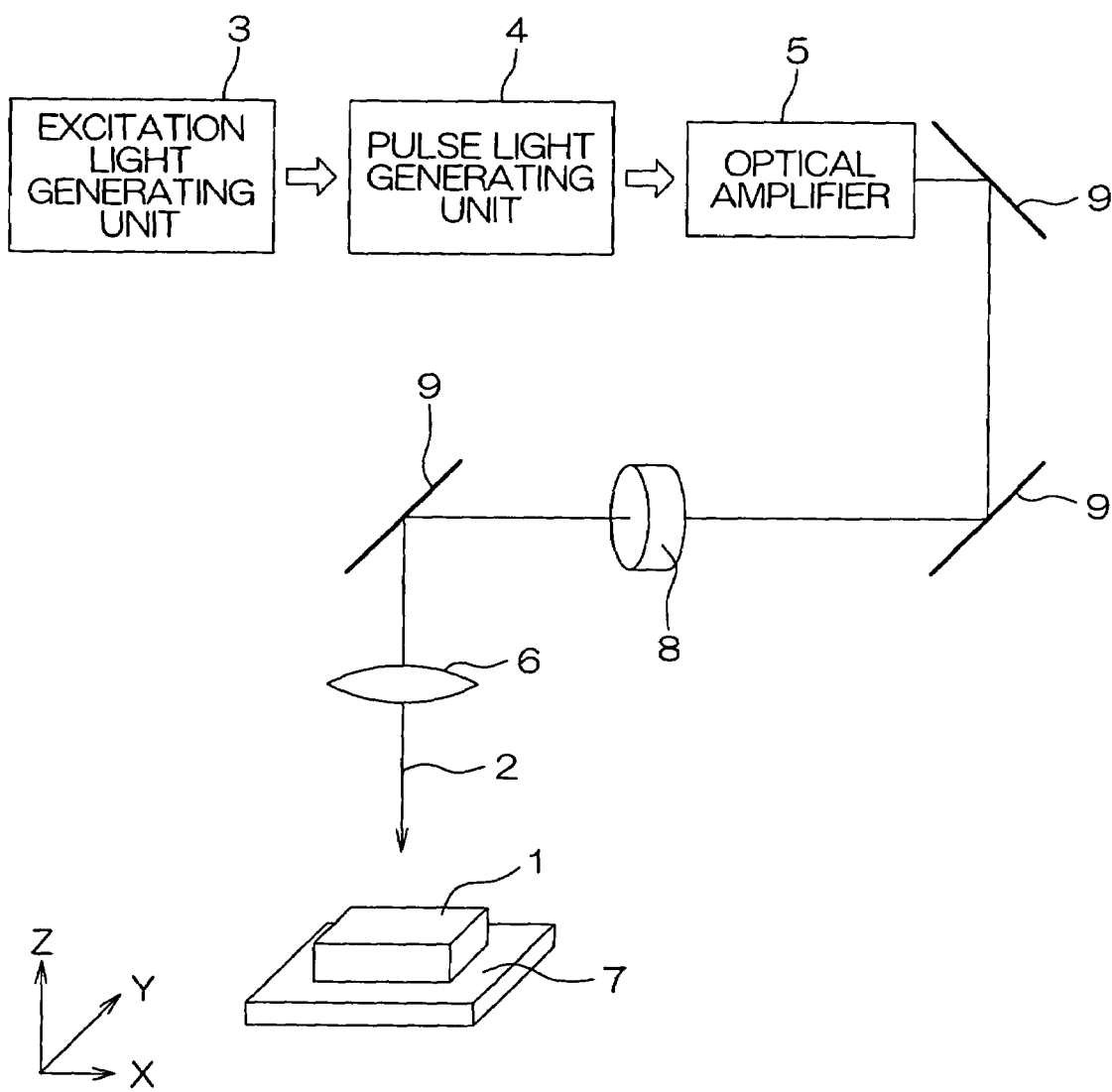

OPTICAL STRUCTURAL BODY, ITS MANUFACTURING METHOD AND OPTICAL ELEMENT

This application is based on application Nos. 2002-263205 and 2003-85658 filed in Japan, the contents of which are incorporated hereinto by reference.

BACKGROUND OF THE INVENTION

1. Field of the Invention

The present invention relates to an optical structural body having a structure which can be applied to a polarizer, a diffraction grading, a reflector, a filter, an optical attenuator or the like to be used in the field of optical communication and the like.

2. Description of the Related Art

A variety of structures have conventionally been proposed for a polarizer to be used in an optical isolator or the like, a diffraction grating to be used as an optical lens, and a reflector, a filter or an optical attenuator to be used in a spectroscope or the like.

To produce such conventional optical elements, however, vacuum evaporation, sputtering, lithography or the like has been used for forming a fine periodic structure in the submicron order suited for integration of an optical circuit. This disadvantageously not only complicates the production steps, but also makes the equipment arrangement in a large scale, resulting in increase in cost of the optical elements.

In view of the foregoing, it is an object of the present invention to provide an excellent optical structural body, its manufacturing method and an optical element in which production can be conducted in an easy and quick manner, in which a fine periodic structure in the submicron order can readily be achieved, in which the direction, width and/or pitches of the fine periodic structure can optionally be controlled, and in which a three-dimensional periodic structure can be obtained.

BRIEF SUMMARY OF THE INVENTION

By condensing and irradiating, in a specific polarizing mode, pulse laser having a pulse width in the femtosecond order ($10^{-12}$~$10^{-15}$ second) to the inside of a light transmitting substrate, a refractive-index changing region can be formed only at the condensing position. This phenomenon that the refractive-index is changed by irradiating such femtosecond pulse laser, is called "a photoinduced change in refractive-index", and a formation of a light guide is known as an example.

The Inventor has discovered that there is formed, in the region presenting the photoinduced change in refractive-index, a periodic structure in which high refractive-index zones and low refractive-index zones are repeatedly being formed at pitches of 1 μm or less.

In the periodic structure, the planes in which the high refractive-index zones or the low refractive-index zones are being joined to one another, are defined as "principal planes". It is noted that since the high refractive-index zones and the low refractive-index zones are adjacently alternately formed, it is substantially the same whether the planes in which the high refractive-index zones are being joined to one another, are defined as "principal planes", or whether the planes in which the low refractive-index zones are being joined to one another, are defined as "principal planes". To make clear the definition in the following description, however, the planes in which the high refractive-index zones are being joined to one another, are defined as "principal planes".

The principal planes are formed in parallel to the polarized magnetic field direction of the irradiated pulse laser. Since the pulse laser is an electromagnetic wave, the pulse laser in its nature propagates while changing at predetermined oscillation frequency in the electric and magnetic fields with the electric and magnetic fields maintained in an orthogonal relationship. In this specification, the direction of the magnetic field of the pulse laser is called a "polarized magnetic field direction".

The periodic structure is formed by interference of the irradiated pulse laser with plasma generated inside of the condensing position. Accordingly, the number of irradiated pulse laser beams may be only one.

As conventionally reported, there is known an example in which at least two pulse laser beams to be irradiated are used to form a periodic structure by interference of these pulse laser beams with each other. According to the present invention, however, the number of the pulse laser beams to be used is only one, thus extremely simplifying the equipment arrangement and the like.

It is a matter of course that pulse laser may be divided into at least two beams by a beam splitter or the like, or at least two pulse laser beams maybe used, such that these at least two beams are simultaneously irradiated to different parts of a light transmitting substrate. In such a case, there can be formed, inside of each pulse laser condensing position of the light transmitting substrate, a periodic structure in which high refractive-index zones and low refractive-index zones are repeatedly being formed with predetermined pitches of, for example, 1 μm, or less.

The pitches in the periodic structure depend on the wavelength of the irradiated pulse laser, the number of irradiated pulses or the pulse energy.

The periodic structure is formed by interference of the irradiated pulse laser with plasma generated inside of the condensing position. Accordingly, the following equation (1) is established from the law of conservation of momentum:

$$k_d = k_p - k_w \quad (1)$$

wherein $k_w$ is the wave number vector of the pulse laser to be irradiated, $k_p$ is the wave number vector of the plasma to be generated, and $k_d$ is the modulated vector of repeat of the high refractive-index zones and the low refractive-index zones of the periodic structure to be formed.

When it is now supposed that the wavelength of pulse laser to be irradiated is defined as λ, the equation of $k_w = 2\pi/\lambda$ is established. Further, when it is now supposed that the periodic structure pitches are defined as Λ, the equation of $k_d = 2\pi/\Lambda$ is established.

Accordingly, when the wavelength λ of pulse laser to be irradiated is decreased, $k_w$ is increased and $k_d$ is decreased according to the equation (1). As a result, the pitches Λ in the periodic structure are increased.

The frequency $\omega_p$ in the longitudinal optical mode in plasma is expressed by the following equation (2):

$$\omega_p^2 = \frac{n_e e^2}{\varepsilon_0 m_e} + \frac{3\kappa_B T_e}{m_e} k_p^2 \quad (2)$$

wherein $n_e$ is the electron density of the generated plasma, e is the electron charge of the generated plasma, $\epsilon_0$ is the dielectric constant of vacuum, $m_e$ is the electron mass of the generated plasma, $\kappa_B$ is the Boltzmann constant, and $T_e$ is the electron temperature of the generated plasma.

When the pulse energy and the irradiated pulse number of the pulse laser to be irradiated are increased, the electron density $n_e$ of the generated plasma and the electron temperature $T_e$ of the generated plasma are proportionally increased, and $k_p$ is decreased. As a result, the modulated vector $k_d$ of the periodic structure is decreased and the pitches $\Lambda$ of the periodic structure are increased.

The power density of the pulse laser depends on the type of the light transmitting substrate, but is preferably not less than $10^8$ W/cm$^2$ in order to form, inside of the condensing position, the periodic structure of the present invention in which high refractive-index zones and low refractive-index zones are repeatedly being formed with predetermined pitches or less.

The power density is a value obtained by dividing, by an irradiation unit area, the output power (W) of the pulse laser expressed in term of "the output energy peak value (J)/pulse width (second)". When the power density is smaller than $10^8$ W/cm$^2$, there are instances where an effective periodic structure is not formed inside of the condensing position. As the pulse energy is higher, the contrast between the high refractive-index zones and the low refractive-index zones becomes clearer (the difference in refractive-index becomes larger).

However, when a laser light having an excessively high pulse energy amount is irradiated, a cavity defect is formed in the condensing position due to thermal effect. Accordingly, with the composition of the light transmitting substrate taken into consideration, the repetition frequency may be adjusted such that the power density of the pulse laser is in the range between the threshold at which the periodic structure having pitches not greater than a predetermined value, e.g. 1 μm, is formed inside of the condensing position, and the threshold at which a cavity defect is formed inside of the condensing position. More specifically, also in view of the productivity, the lower limit of the repetition frequency of the pulse laser is set to 1 Hz, preferably set to 10 kHz, and more preferably set to 100 kHz, and the upper limit is set to 100 MHz. The pulse laser may be an optical pulse of a single shot.

Even with a high repetition-frequency pulse laser, a periodic structure having pitches of a predetermined value or less can be formed inside of the condensing position if there can be obtained a power density which causes a photoinduced change in refractive-index. On the contrary, even with a low repetition-frequency pulse laser of 10 kHz or less, a periodic structure having pitches of a predetermined value or less can also be formed inside of the condensing position by adjusting, with the use of an ND (neutral density) filter or the like, the power density to not greater than the threshold at which a cavity defect is formed.

In order that the pulse laser energy is adjusted between the threshold at which a periodic structure having pitches of a predetermined value or less is formed inside of the condensing position, and the threshold at which a cavity defect is formed, and that there is formed a periodic structure in which the periodic pitches are uniform, in which the principal planes have the same width and are regularly aligned in the same direction, and in which the periodicity is excellent, it is preferable to adjust, in the range of 0.1 μJ/pulse to 10 μJ/pulse, the energy per pulse of the irradiated pulse laser, although this energy depends on the type of the light transmitting substrate.

Pulse laser is condensed by a condensing element such as a lens or the like. The region having the periodic structure is basically spherical. While propagating in the light transmitting substrate, the pulse laser having a pulse energy causing a photoinduced change in refractive-index, is influenced by Kerr effect, i.e. a three-dimensional nonlinear optical effect. This causes the shape of the pulse laser condensing position to be preferably spherical. The diameter of the sphere is preferably in a range from 0.1 μm to 1 mm.

When this condensing position is continuously moved in a predetermined direction with respect to the light transmitting substrate, there can be formed an optical structural body in which a region having the periodic structure extends in the form of a cord having a circular section or in the form of a column.

Further, when this condensing position is intermittently moved in a predetermined direction at regular intervals with respect to the light transmitting substrate, there can be formed an optical element having so-called double periodic structures in which a plurality of spherical regions each having the periodic structure are repeatedly formed.

Further, when this condensing position is continuously moved in a predetermined direction at regular intervals with respect to the light transmitting substrate, there can be formed an optical element having so-called double periodic structures in which there are repeatedly formed a plurality of periodic structures each in the form of a cord having a circular section or in the form of a column.

When such double periodic structures are three-dimensionally formed in a light transmitting substrate, a diffraction effect, a polarization effect, and a birefringent effect can simultaneously be produced for a multiple-wavelength optical signal.

The birefringent effect is not generally produced in a glass material because of its isotropic structure. However, when there are formed periodic structures in which high refractive-index zones and low refractive-index zones are repeatedly being formed at pitches of a predetermined value or less, the birefringent effect can be given to an isotropic material even originally presenting no birefringent effect.

When light of wavelength division multiplex is incident upon an optical element having double periodic structures in which there are repeatedly formed a plurality of periodic structures in which high refractive-index zones and low refractive-index zones are repeatedly being formed at pitches of a predetermined value or less, the reflectance of a specific wavelength can be increased in dependence of the double periodic structures.

As discussed in the foregoing, according to the optical structural body of the present invention, there can be formed, inside of the condensing position, a periodic structure in which high refractive-index zones and low refractive-index zones are repeatedly being formed at pitches of a predetermined value or less. This optical structural body can be formed at an optional position inside of a light transmitting substrate. When an optical signal in a predetermined wavelength range is incident upon this optical structural body, a polarization effect, an interference effect and a diffraction effect can be produced.

Further, when the optical structural body of the present invention is formed in an isotropic light transmitting substrate which does not originally present a birefringence phenomenon, a birefringent effect can be given to this optical structural body, enabling the same to serve as a polarizer of an optical isolator or the like.

Further, when light of wavelength division multiplex is incident upon the optical structural body of the present invention having double periodic structures, the reflectance of a specific wavelength in dependence on the periodic structure can be increased. Thus, this optical structural body serves as a reflector, a filter, or an optical attenuator which reflects light of a specific wavelength only.

An optical structural body manufacturing method according to the present invention utilizes interference of pulse laser condensed in a light transmitting substrate with plasma generated inside of the condensing position. Accordingly, merely by irradiating a single pulse laser beam without subjecting to complicated processing steps, there can readily be produced an optical structural body having a periodic structure in which high refractive-index zones and low refractive-index zones are repeatedly being formed at pitches of a predetermined value or less.

The optical structural body of the present invention can be applied for a control element in the polarization direction of an optical signal to be used in optical communication, an optical element which produces a diffraction effect, and an optical element such as a reflector, a filter or an optical attenuator which reflects an optical signal of a specific wavelength.

BRIEF DESCRIPTION OF THE DRAWINGS

FIG. 1 is a schematic view of apparatus for producing an optical structural body of the present invention;

Each of FIG. 2A to FIG. 2C is a section view illustrating a periodic structure formed in a refractive-index changing region, wherein

Each of FIG. 4A to FIG. 4C is a section view illustrating a periodic structure formed in a refractive-index changing region, wherein

DETAILED DESCRIPTION OF THE INVENTION

Figure 2A:
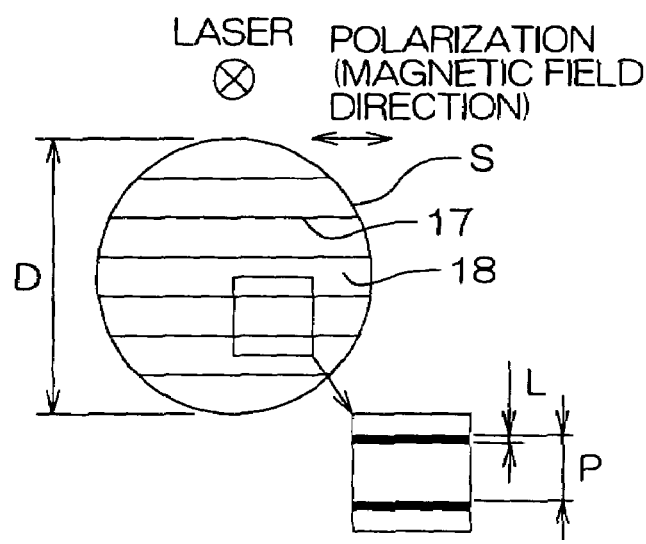
FIG. 2A is a front view in a light irradiation direction.

FIG. 1 is a schematic view of apparatus for producing an optical structural body of the present invention.

This optical structural body producing apparatus comprises an excitation light generating unit 3 for generating excitation light, a pulse light generating unit 4 for generating pulse laser based on the excitation light, and an optical amplifier 5 for amplifying the pulse laser.

The excitation light generating unit 3 is formed of a gas laser of Ar or the like, or a semiconductor laser of GaAs or the like.

The pulse light generating unit 4 is formed of a Ti:Al$_2$O$_3$ (titanium-doped sapphire crystal) laser. The Ti:Al$_2$O$_3$ laser is arranged to oscillate, by its mode lock mechanism, pulse light having a pulse width in the femtosecond order ($10^{-12}$~$10^{-15}$ second). The wavelength of the pulse light is variable (100 nm~2000 nm), but is for example set to 800 nm such that the pulse laser transmits a glass material 1.

The optical amplifier 5 is formed of a crystal solid laser such as Q switch Nd:YAG laser or the like.

Pulse laser supplied from the optical amplifier 5 is reflected by mirrors 9. Then, a linear polarized light is taken out by a polarization plate 8 and condensed on the surface or inside of the glass material 1 by a condensing member 6 such as a lens or the like. The glass material 1 is disposed on an electrically-operated stage 7 capable of scanning in the X, Y, and Z directions.

The polarized light of pulse laser supplied from the optical amplifier 5 is generally a linear polarized light. However, when the polarization plate 8 is interposed in the optical path, the polarization can be aligned and the polarized angle can optionally be changed.

Examples of the glass material 1 to which pulse laser is to be irradiated, include glass materials such as oxide glass, halide glass, chalcogenide glass and the like, and crystal materials such as sapphire, crystal and the like. Examples of the oxide glass include glass of the silicate type, glass of the borate type, glass of the phosphate type, glass of the phosphite type, glass of the bismuth type and the like. Examples of the halide glass include glass of the BeF$_2$ type, glass of the ZrF$_4$ type, glass of the InF$_3$ type, glass of the Cd—Zn—Cl type and the like. Examples of sulfide glass include glass of the Ga—La—S type and the like. Examples of the chalcogenide glass include glass of the S—As type and the like.

Pulse laser having power density of $10^8$ W/cm$^2$ or more is condensed at the condensing position on the surface or inside of the glass material 1. This causes a phenomenon of photoinduced change in refractive-index to be generated inside of the condensing position. This results in formation of a substantially spherical refractive-index changing region. The size of the refractive-index changing region is defined by the capacity of the condensing member 6, the pulse laser wavelength and the pulse energy, but is generally in the range of 1 μm to 1 mm.

Further formed inside of the refractive-index changing region is a periodic structure in which high refractive-index zones and low refractive-index zones are being repeatedly formed at pitches of 1 μm or less (submicron).

Figure 2B:
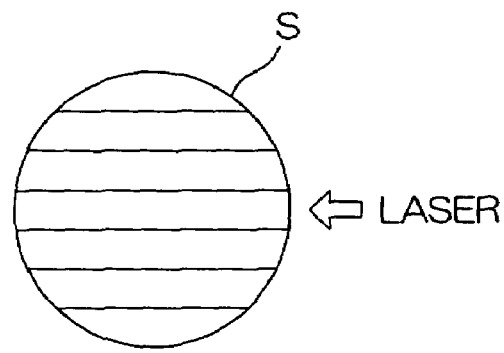
FIG. 2B is a side view and FIG. 2C is a plan view.
Figure 2C:
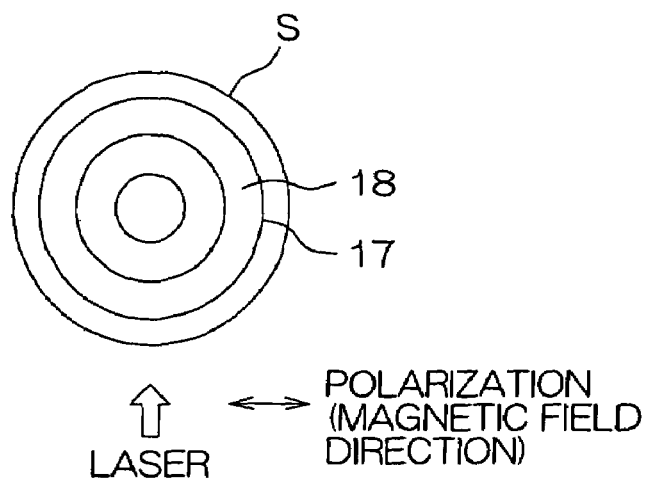

Each of FIG. 2A to FIG. 2C is a section view illustrating a periodic structure formed in a refractive-index changing region.

High refractive-index zones 17 and low refractive-index zones 18 are periodically alternately formed in the refractive-index changing region S. Each periodic pitch is expressed by P, and the width of each high refractive-index zone 17 is expressed by L. These pitch P and width L are dependent on the polarization direction of the pulse laser to be irradiated, the wavelength, the number of the irradiated pulses, the pulse energy and the like. Accordingly, by setting these values as variables, there can be prepared a periodic structure suitable for an optical signal of an optional wavelength range.

FIG. 2A shows a periodic structure prepared by irradiating, vertically to the paper plane, pulse laser of which magnetic field polarization direction is horizontal. In the periodic structure formed in the spherical refractive-index changing region S (of which diameter is expressed by D), the planes (principal planes) in which the high refractive-index zones 17 are joined to one another, are formed in round slices in parallel to the magnetic field polarization direction.

FIG. 2B shows a periodic structure prepared by irradiating pulse laser horizontally from the right hand of the paper plane. The pulse laser light is vertical to the paper plane.

FIG. 2C shows a periodic structure prepared by irradiating pulse laser light upwardly from the lower part of the paper plane.

Figure 3A:
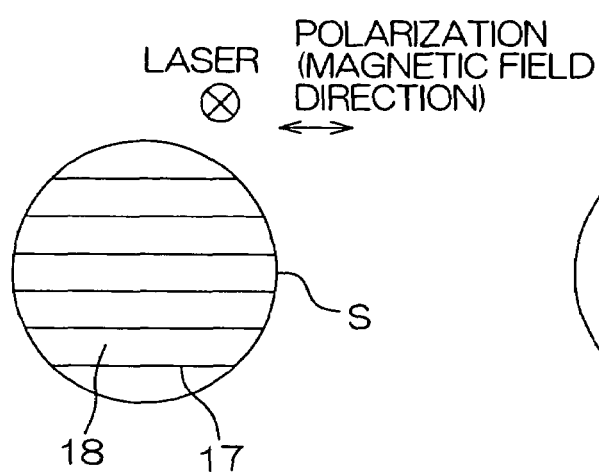
FIG. 3A is a section view illustrating a periodic structure formed in a refractive-index changing region when there is irradiated pulse laser of which polarized magnetic field direction is horizontal.
Figure 3B:
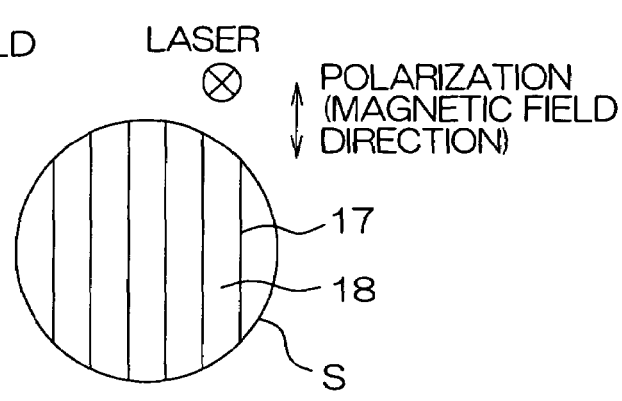
FIG. 3B is a section view illustrating a periodic structure formed in a refractive-index changing region when there is irradiated pulse laser of which polarized magnetic field direction is vertical.

FIG. 3A and FIG. 3B show the relationship between the principal plane forming direction and the pulse laser polarization. FIG. 3A shows a periodic structure prepared by irradiating, vertically to the paper plane, pulse laser of which magnetic field polarization direction is horizontal. FIG. 3B shows a periodic structure prepared by irradiating, vertically to the paper plane, pulse laser of which magnetic field polarization direction is vertical. Thus, the direction of the principal planes formed by the high refractive-index zones 17, is identical with the polarized magnetic field direction.

According to the present invention having the arrangement above-mentioned, a periodic structure in which the refractive-index is changed in the submicron order, can be formed in the refractive-index changing region. The periodic direction of the periodic structure can be set in an optional direction by setting the polarized magnetic field direction of the pulse laser to be irradiated.

Figure 4A:
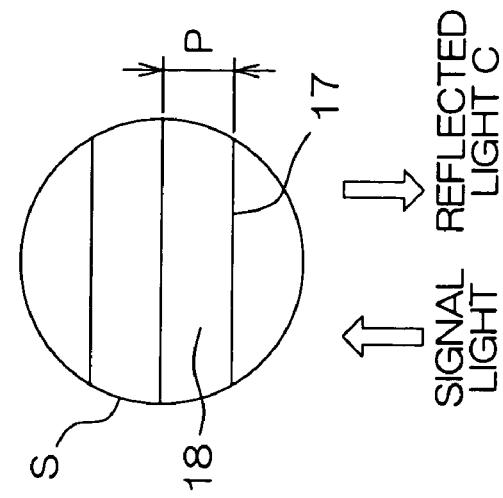
FIG. 4A illustrates an example in which an optical signal of wavelength division multiplex is vertically irradiated onto the principal planes of the periodic structure formed in the refractive-index changing region.
Figure 4B:
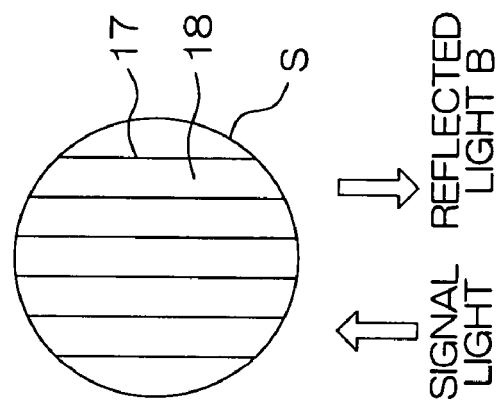
FIG. 4B illustrates an example in which an optical signal of wavelength division multiplex is irradiated, in a parallel manner, to the principal planes of the periodic structure formed in the refractive-index changing region.
Figure 4C:
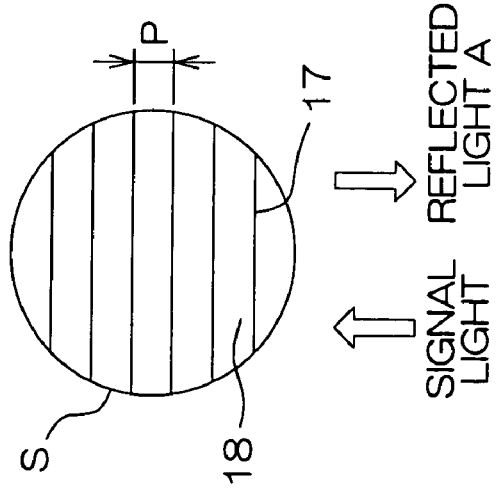
FIG. 4C illustrates an example in which an optical signal of wavelength division multiplex is vertically irradiated onto the principal planes of the periodic structure formed in the refractive-index changing region, and in which each pitch P in the periodic structure is larger.

FIG. 4A to FIG. 4C are section views illustrating the structures of refractive-index changing regions formed by setting the polarization direction of pulse laser to be irradiated, the wavelength, the number of irradiated pulses, the pulse energy and the like, these structures being different in principal plane direction and in pitch P in the periodic structures from one another.

In the refractive-index changing region S in FIG. 4A, the principal plane direction is horizontal. A signal light of wavelength division multiplex is vertically incident upon the principal planes. In the refractive-index changing region S in FIG. 4B, the periodic pitches P are the same as in FIG. 4A, but the principal plane direction is vertical. A signal light of wavelength division multiplex is incident upon the principal planes in parallel thereto. FIG. 4C shows the structure in which a signal light of wavelength division multiplex is vertically incident upon the principal planes as done in FIG. 4A, but the periodic pitches P are different from those in FIG. 4A.

By a difference in the incident angle of signal light of wavelength division multiplex and a difference in pitch P, it can be expected to increase the reflectance of a specific wavelength in dependence on the incident angle upon the principal planes and the pitches P. More specifically, a reflected light A reflected in FIG. 4A, a reflected light B reflected in FIG. 4B, and a reflected light C reflected in FIG. 4C, are different in wavelength from one another.

In the foregoing, the description has been made of the case in which a single refractive-index changing region is formed. However, a plurality of refractive-index changing regions may be formed. Further, the shape of the refractive-index changing region is not limited to a spherical shape.

In FIG. 1, after laser light has been irradiated to the glass material 1, the laser light is turned off. Then, the glass material is moved by a predetermined distance in the X, Y and Z directions, and laser light is irradiated again to the glass material 1. When such operations are repeated, there can be discretely repeatedly formed, on the surface or inside of the glass material 1, a plurality of spherical refractive-index changing regions each having the periodic structure above-mentioned.

By continuously moving, by a predetermined distance in the X, Y and Z directions, the glass material under irradiation by laser light, a refractive-index changing region having the periodic structure can be formed on the surface or inside of the glass material in the shape of a column or a curved cord having a circular section.

Further, the glass material 1 under irradiation by laser light, is continuously moved in one direction selected from the X, Y and Z directions. After the movement is finished, the laser light is turned off and the glass material 1 is intermittently moved by a predetermined distance in other direction. Then, the laser light is again turned on and the glass material 1 is continuously moved in the one direction. When such operations are repeated, a plurality of column-like refractive-index changing regions can repeatedly be formed on the surface or inside of the glass material 1.

Further, the glass material 1 is continuously moved in a manner of a curved line in an optional direction. After the movement is finished, the laser light is turned off. Then, the glass material 1 is intermittently moved by a predetermined distance in other direction. The laser light is again turned on and the glass material 1 is moved in a manner of a curved line. When such operations are repeated, there can repeatedly be formed, on the surface or inside of the glass material 1, a plurality of refractive-index changing regions each in the shape of a curved cord having a circular section.

Thus, when a plurality of refractive-index changing regions are formed at regular intervals in a predetermined direction, there can be formed, at an optional position in the glass material, an optical structural body in which the refractive-index changes in a double periodic manner. The predetermined intervals may be for example in the range of 1 μm to 1 mm.

Figure 5:
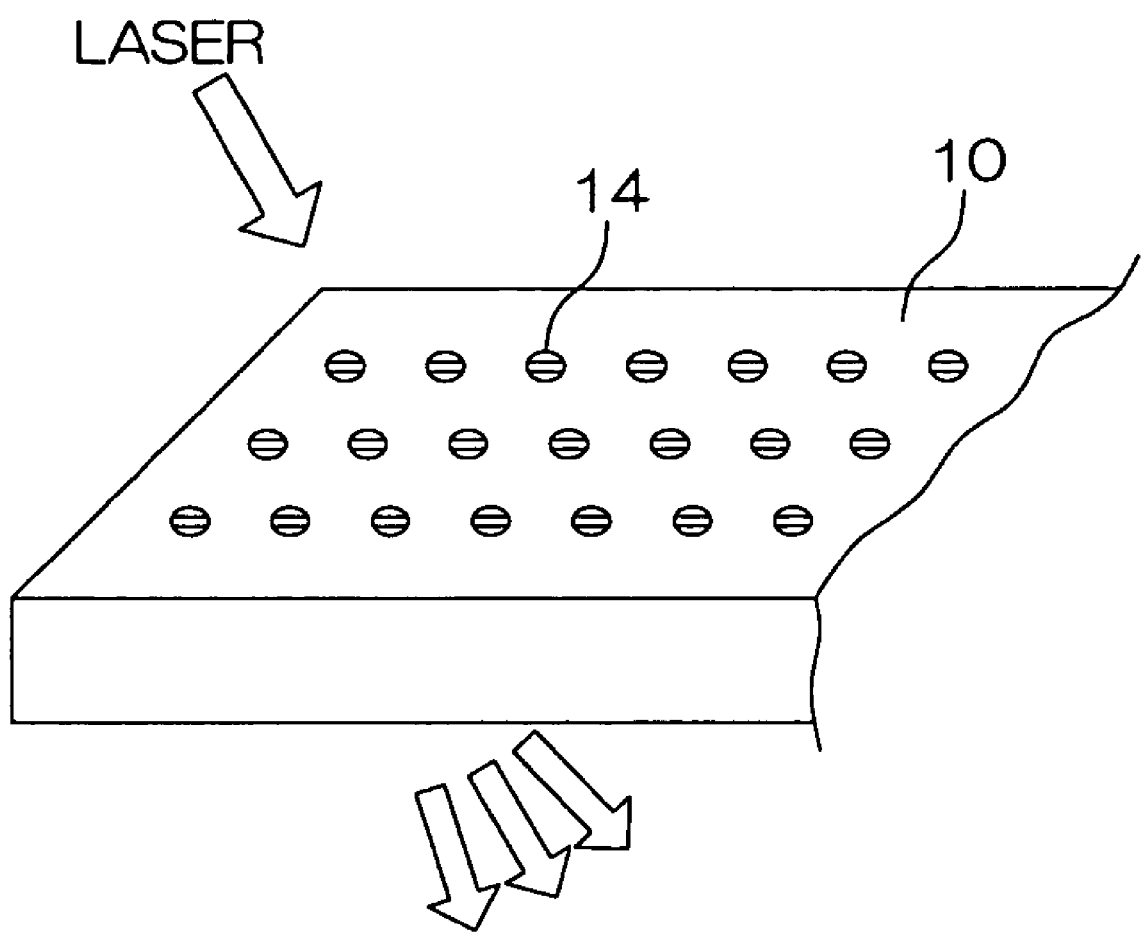
FIG. 5 is a perspective view of an example in which an optical structural body having double periodic structures is used as a diffraction grating or a polarizer.

When an optical signal of optional wavelength and optional polarization is incident upon an optical structural body having such double periodic structures as shown in FIG. 5, it is possible to expect that this optical structural body produces the effect of a diffraction grating or a polarizer which not only diffracts the optical signal in a predetermined direction per wavelength, but also takes out an optical signal of predetermined polarization. Further, a combination of two polarizers having the arrangement abovementioned and a Faraday rotor held therebetween, can serve as an optical isolator.

Figure 6:
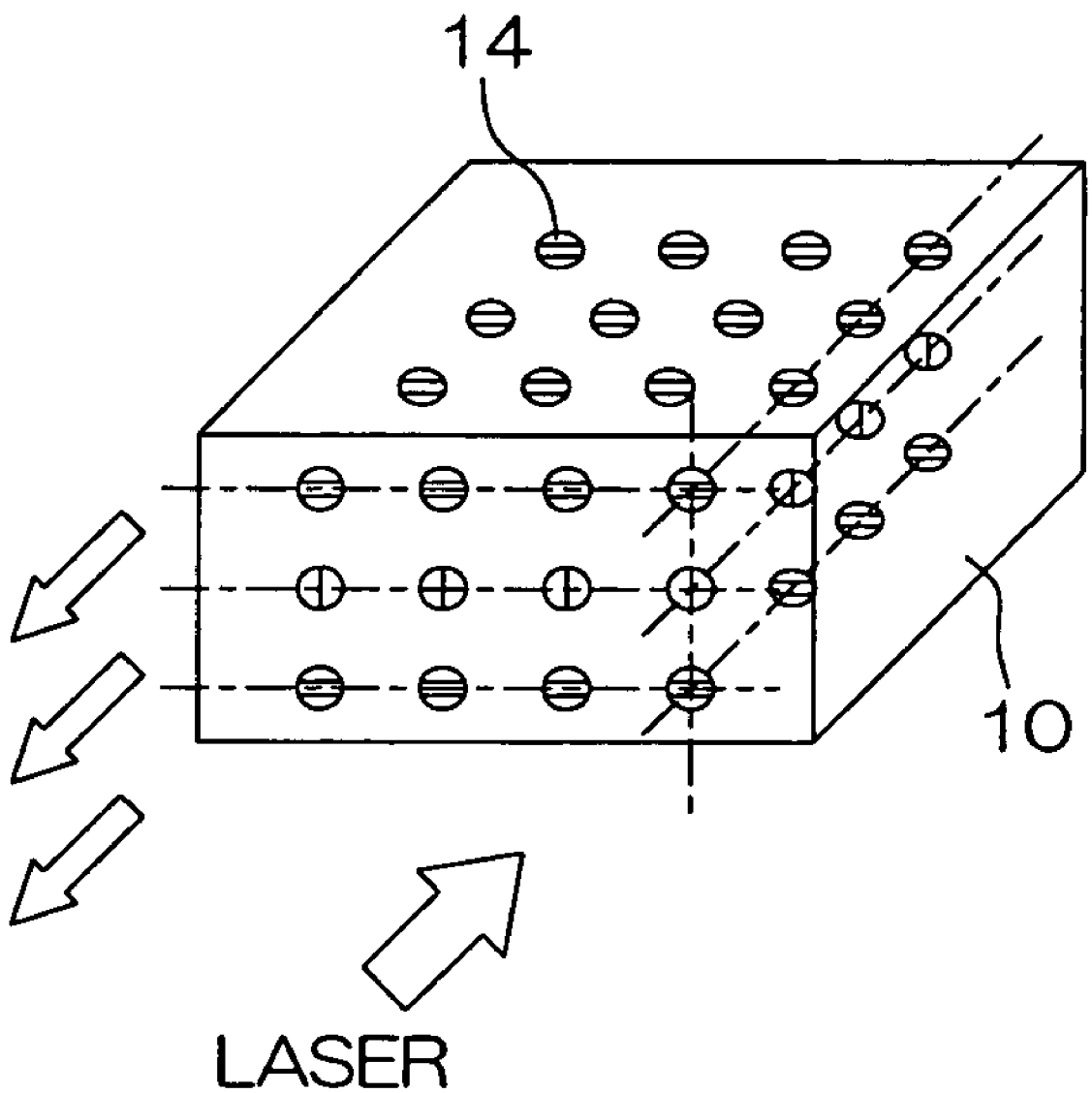
FIG. 6 is a perspective view of an optical structural body having double periodic structures to be used as a reflector or a filter.

When the optical structural body has a three-dimensionally layered arrangement with the directions and pitches of the principal planes of the periodic structures changed in each layer as shown in FIG. 6, this optical structural body can be applied for a reflector or a filter for reflecting, with high efficiency, only an optical signal of a specific wavelength from the optical signal of wavelength division multiplex.

The embodiments above-mentioned are shown only by way of examples, and the present invention may suitably be embodied in different manners without departing from the scope of the present invention.

EXAMPLE 1

Figure 7:
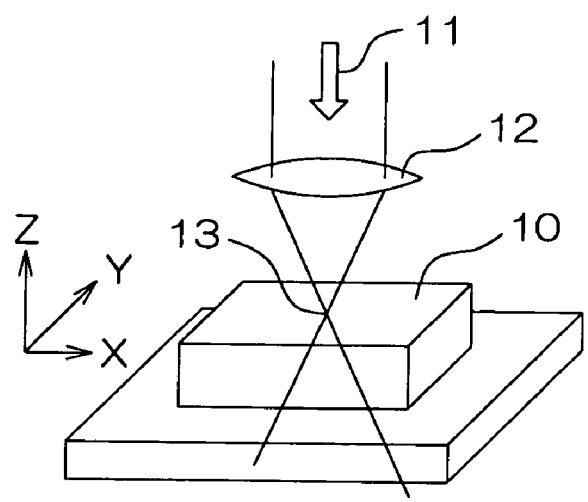
FIG. 7 is a perspective view of a quartz glass substrate to which pulse laser is being irradiated.

A plurality of refractive-index changing regions were repeatedly formed in a quartz glass substrate 10 of 10 mm×10 mm×5 mm. As shown in FIG. 7, pulse laser 11 was condensed by a lens 12 and irradiated to the quartz glass substrate 10 such that the condensing position 13 of the pulse laser 11 was located inside of the quartz glass substrate 10. Used as the pulse laser was laser which was oscillated from Ti:$Al_2O_3$ laser excited by argon laser, of which pulse width was 150 femtoseconds, of which repetition frequency was 200 kHz, of which wavelength was 800 nm, of which average output was 600 mW, and of which polarized magnetic field is horizontal. The irradiation period of time was 4 seconds for one condensing position.

Formed in the condensing position 13 was a striped periodic structure in which first and second zones different in refractive-index from each other were formed at pitches of 1 μm or less.

The diameter of the refractive-index changing region having the periodic structure thus formed, was about 2 μm, the pitches P in the periodic structure were 200 nm, the width L of the first zone was about 30 nm, and the width of the second zone was about 170 nm.

The first zone including an oxygen defect was changed to a composition $SiO_{2-x}$ ($0<x<2$). It is therefore considered that its refractive-index is higher than the ambient refractive-index (the refractive-index of the glass substrate except for the periodic structure). From the first zone, oxygen was moved to the second zone and taken in the structure thereof, causing the second zone to be changed to a composition $SiO_{2+x}$. It is therefore considered that its refractive-index is substantially equal to or less than the ambient refractive-index (the refractive-index of the glass substrate except for the periodic structure). However, it can be considered that as oxygen is decreased in amount, the refractive-index is lowered, and that as oxygen is increased in amount, the refractive-index is increased. Accordingly, the relationship between oxygen and refractive-index cannot definitely be determined at the present stage. However, it is true that the first and second zones undergo a change in refractive-index.

The size D of the refractive-index changing region is variable in the range of about 1 μm to about 100 μm dependent on the pulse energy of the pulse laser to be irradiated and the magnification of the lens used for light collection. Dependent on the wavelength of pulse laser to be irradiated, the number of irradiated pulses, the pulse energy and the refractive-index of the glass substrate, the width L of the first zone is variable in the range of about 10 to about 50 nm and the width of the second zone is variable in the range of about 50 to about 190 nm.

Figure 8A:
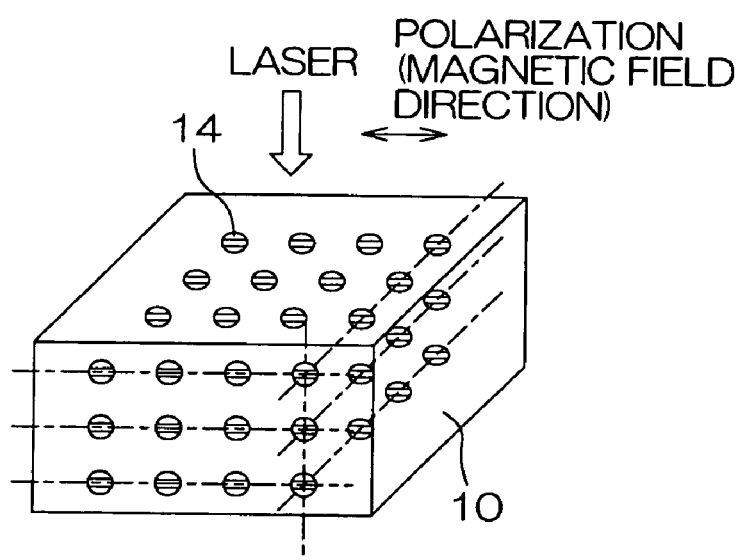
FIG. 8A is a perspective view of an optical structural body in which the condensing position has been intermittently moved in three directions at regular intervals with respect to the glass substrate to form a plurality of spherical refractive-index changing regions in the shape of a three-dimensional lattice.
Figure 8B:
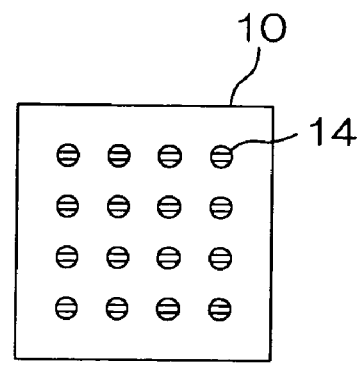
FIG. 8B is a plan view of FIG. 8A.

When the condensing position 13 is intermittently moved at predetermined intervals in the X, Y and Z directions with respect to the inside of the quartz glass substrate 10 (the irradiation period of time is 4 seconds for one condensing position), spherical refractive-index changing zones 14 are repeatedly formed as shown FIG. 8A. FIG. 8B is a plan view of the quartz glass substrate 10 in which these refractive-index changing zones 14 are repeatedly being formed.

Figure 9A:
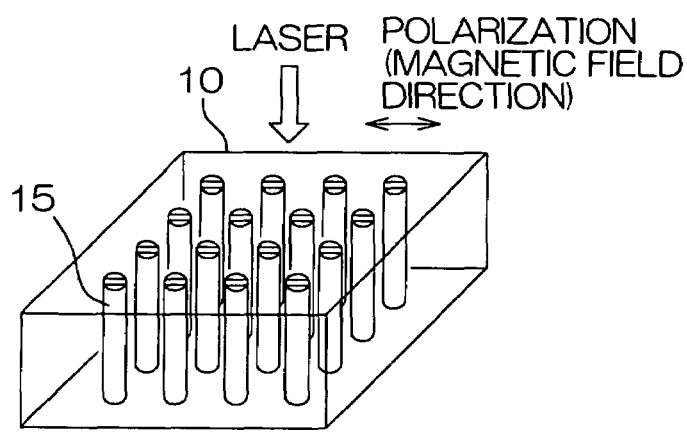
FIG. 9A is a perspective view of an optical structural body in which a plurality of column-like refractive-index hanging regions are formed in a two-dimensional manner.
Figure 9B:
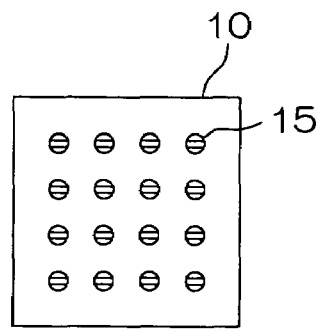
FIG. 9B is a plan view of FIG. 9A.

When the pulse laser 11 is intermittently moved in the X and Y directions, and continuously moved in the Z direction with respect to the inside of a quartz glass substrate (the Z-directional moving speed is 100 μm/sec.), column-like refractive-index changing zones 15 are repeatedly formed as shown FIG. 9A. FIG. 9B is a plan view of the quartz glass substrate 10 in which such column-like refractive-index changing zones 15 are being repeatedly formed.

Figure 10:
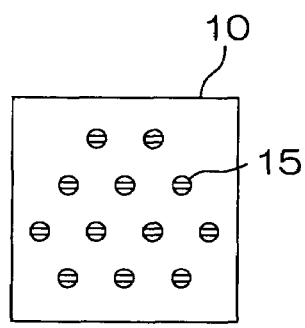
FIG. 10 is a plan view of an optical structural body in which a plurality of refractive-index changing regions are formed in the shape of a triangle lattice.

Further, when the pulse laser 11 is intermittently moved in the direction at 60° from the X direction (30° from the Y direction) and is continuously moved in the Z direction at the speed above-mentioned with respect to a quartz glass substrate 10, there can be formed, in the quartz glass substrate 10, column-like refractive-index changing zones 15 generally in the shape of a triangle grating as shown in FIG. 10.

Figure 11A:
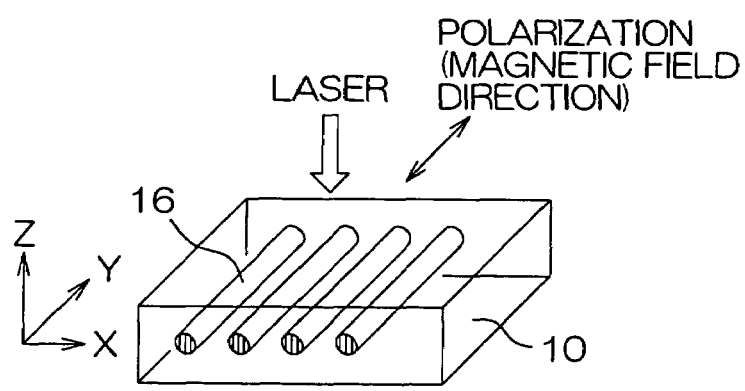
FIG. 11A is a perspective view of an optical structural body in which a plurality of column-like refractive-index changing regions are formed in a two-dimensional manner.
Figure 11B:
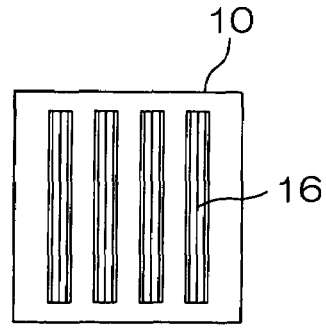
FIG. 11B is a plan view of FIG. 11A.

When the pulse laser 11 is intermittently moved in the X direction and is continuously moved in the Y direction (at the speed of 100 μm/sec), there are formed column-like refractive-index changing zones 16 as shown in FIG. 11A. FIG. 11B is a plan view of the quartz glass substrate 10 in which the column-like refractive-index changing zones 16 are repeatedly being formed.

EXAMPLE 2

As done in Example 1, pulse laser 11 was irradiated to a quartz glass substrate 10 of 10 mm×10 mm×5 mm such that the condensing position of the pulse laser 11 was located inside of the quartz glass substrate 10. The pulse laser irradiation conditions were the same as those used in Example 1.

In Example 2, the pulse laser was irradiated with its polarization direction (magnetic field) changed to horizontal or vertical by the linear polarization plate 8 in FIG. 1.

As shown in FIG. 3A and FIG. 3B, there was formed, in the direction in dependence on the pulse laser light polarization direction (magnetic field), a striped periodic structure in which high refractive-index zones and low refractive-index zones were being repeatedly formed. More specifically, a transversely striped periodic structure was formed when the polarization direction is horizontal (FIG. 3A), and a longitudinally striped periodic structure was formed when the polarization direction is vertical (FIG. 3B).

As in Example 1, the condensing position was intermittently or continuously moved in a predetermined direction at regular intervals with respect to a glass substrate, thereby to repeatedly form spherical or column-like refractive-index changing regions, or refractive-index changing regions each in the shape of a cord having a circular section.

What is claimed is:

1. An optical structural body comprising: a laser light transmitting substrate; and a region having a periodic structure in which high refractive-index zones and low refractive-index zones are repeatedly being generated at a light condensing position of the substrate, wherein the light condensing position is defined by irradiating, to the substrate, a single condensed pulse laser light beam having an energy amount causing a photoinduced change in refractive-index to the substrate.

2. An optical structural body according to claim 1, wherein principal planes of the periodic structure defined as the planes in which the high refractive-index zones or the low refractive-index zones are being joined to one another, are formed in parallel to the polarized magnetic field direction of the irradiated pulse laser.

3. An optical structural body according to claim 1, wherein the pitches in the periodic structure are formed in dependence on the wavelength of the irradiated pulse laser, the number of irradiated pulses or the pulse energy.

4. An optical structural body comprising: a laser light transmitting substrate: and a region having a periodic structure in which high refractive-index zones and low refractive-index zones are repeatedly being generated at a light condensing position of the substrate, wherein the light condensing position is defined by irradiating, to the substrate, a single condensed pulse laser light beam having an energy amount causing a photoinduced change in refractive-index to the substrate, wherein the pitches in the periodic structure are 1 µm or less.

5. An optical structural body according to claim 1, wherein the region having the periodic structure is spherical.

6. An optical structural body comprising: a laser light transmitting substrate; and a region having a periodic structure in which high refractive-index zones and low refractive-index zones are repeatedly being generated at a light condensing position of the substrate, wherein the light condensing position is defined by irradiating, to the substrate, a single condensed pulse laser light beam having an energy amount causing a photoinduced change in refractive-index to the substrate, wherein the region having the periodic structure is spherical, and the diameter of the spherical body is in the range of 0.1 µm to 1 mm.

7. An optical structural body according to claim 1, wherein the region having the periodic structure is in the form of a cord having a circular section, or in the form of a column.

8. An optical structural body according to claim 1, wherein a plurality of regions each having the periodic structure are repeatedly formed at regular intervals.

9. An optical structural body comprising: a laser light transmitting substrate; and a region having a periodic structure in which high refractive-index zones and low refractive-index zones are repeatedly being generated at a light condensing position of the substrate, wherein the light condensing position is defined by irradiating, to the substrate, a single condensed pulse laser light beam having an energy amount causing a photoinduced change in refractive-index to the substrate, wherein a plurality of regions each having the periodic structure are repeatedly formed at regular intervals, and the predetermined intervals are in the range of 1 µm to 1 mm.

10. An optical structural comprising: a laser light transmitting substrate; and a region having a periodic structure in which high refractive-index zones and low refractive-index zones are repeatedly being generated at a light condensing position of the substrate, wherein the region having the periodic structure is formed in an isotropic material which originally presents no birefringence phenomenon.

11. An optical structural body manufacturing method comprising the steps of:
    irradiating, to a laser light transmitting substrate, a single condensed pulse laser light beam having an energy amount which causes a photoinduced change in refractive-index; and
    forming, at the condensing position, a region having a periodic structure in which high refractive-index zones and low refractive-index zones are repeatedly being formed.

12. An optical structural body manufacturing method according to claim 11, wherein the pulse width of the pulse laser light is in the range of $10^{-12} \sim 10^{-15}$ seconds.

13. An optical structural body manufacturing method according to claim 11, wherein the pulse repetition frequency of the pulse laser light is not greater than 100 MHz.

14. An optical structural body manufacturing method according to claim 11, wherein the pulse of the pulse laser light is a single pulse.

15. An optical structural body manufacturing method according to claim 11, wherein the power density of the pulse laser condensed on the substrate, is not less than $10^8$ W/cm$^2$.

16. An optical structural body manufacturing method according to claim 11, wherein the pulse energy of the pulse laser condensed on the substrate, is in the range of 0.1 µJ/pulse to 10 µJ/pulse.

17. An optical structural body manufacturing method according to claim 11, wherein the step of forming the region having the periodic structure is caused by utilizing interference of the pulse laser light with plasma generated inside of the condensing position.

18. An optical element characterized in that there is utilized, as a polarizer, a diffraction grating, a reflector, a filter or an optical attenuator, an optical structural body formed by irradiating, to a laser light transmitting substrate, a single condensed pulse laser light beam having an energy amount causing a photoinduced change in refractive-index, thereby to form, at the light condensing position, a region having a periodic structure in which high refractive-index zones and low refractive-index zones are repeatedly being generated.

19. An optical element characterized in that light of wavelength division multiplex is incident upon a region having a periodic structure of an optical structural body, thereby to increase the reflectance of a specific wavelength in dependence on the periodic structure, the optical structural body being formed by irradiating, to a laser light transmitting substrate, a single condensed pulse laser light beam having an energy amount causing a photoinduced change in refractive-index, thereby to form, at the light condensing position, the region having the periodic structure in which high refractive-index zones and low refractive-index zones are repeatedly being generated.

20. An optical structural body formed by irradiating, to a laser light transmitting substrate, a single condensed pulse laser light beam having an energy amount causing a photoinduced change in refractive-index, thereby to form, at the light condensing position, a region having a periodic structure in which high refractive-index zones and low refractive-index zones are repeatedly being generated.

* * * * *